United States Patent
Wu et al.

(10) Patent No.: US 10,738,180 B2
(45) Date of Patent: Aug. 11, 2020

(54) THERMOPLASTIC VULCANIZATE AND MANUFACTURING METHOD THEREOF

(71) Applicant: INDUSTRIAL TECHNOLOGY RESEARCH INSTITUTE, Hsinchu (TW)

(72) Inventors: Jin-an Wu, Huwei Township (TW); Bing-Jyun Zeng, Zhubei (TW); Po-I Wang, Tainan (TW); Fu-Ming Chien, Hsinchu (TW); Fan-Jie Lin, New Taipei (TW); Sheng-Lung Chang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 95 days.

(21) Appl. No.: 16/235,974

(22) Filed: Dec. 28, 2018

(65) Prior Publication Data

US 2020/0181371 A1  Jun. 11, 2020

(30) Foreign Application Priority Data

Dec. 7, 2018  (TW) .............................. 107144057 A

(51) Int. Cl.
| | |
|---|---|
| *C08L 15/00* | (2006.01) |
| *C08C 19/40* | (2006.01) |
| *C08L 77/02* | (2006.01) |
| *C08L 77/00* | (2006.01) |

(52) U.S. Cl.
CPC .............. *C08L 15/00* (2013.01); *C08C 19/40* (2013.01); *C08L 77/02* (2013.01); *C08L 77/00* (2013.01); *C08L 2312/08* (2013.01)

(58) Field of Classification Search
CPC .......... C08L 15/00; C08L 13/00; C08L 13/02; C08L 19/00; C08L 19/003; C08L 19/006; C08L 77/00; C08L 77/02; C08L 77/04; C08L 77/06; C08L 77/08; C08L 77/10; C08L 77/12; C08L 2312/08; C08C 19/00; C08C 19/06; C08C 19/36; C08C 19/38; C08C 19/40
See application file for complete search history.

(56) References Cited

U.S. PATENT DOCUMENTS

| | | | |
|---|---|---|---|
| 4,996,264 | A | 2/1991 | Aonuma et al. |
| 5,589,544 | A | 12/1996 | Horrion |
| 5,777,033 | A | 7/1998 | Venkataswamy et al. |
| 6,020,431 | A | 2/2000 | Venkataswamy et al. |
| 6,579,944 | B1 | 6/2003 | Abdou-Sabet et al. |
| 8,921,460 | B2 | 12/2014 | Oriani |
| 9,539,859 | B2 | 1/2017 | Shibata |
| 9,540,510 | B2 | 1/2017 | Blok et al. |
| 9,546,251 | B2 | 1/2017 | Nadella et al. |
| 9,580,582 | B2 | 2/2017 | Kawaguchi |
| 2003/0045638 | A1* | 3/2003 | Qiao ........................ C08L 21/00 525/178 |
| 2006/0155072 | A1* | 7/2006 | Rakhman ................ C08L 51/06 525/242 |

FOREIGN PATENT DOCUMENTS

| | | |
|---|---|---|
| CN | 1074779 C | 11/2001 |
| CN | 101177506 A | 5/2008 |
| CN | 101775166 A | 7/2010 |
| CN | 102585416 A | 7/2012 |
| CN | 105255082 A | 1/2016 |
| TW | 200704694 A | 2/2007 |
| TW | 201314364 A1 | 4/2013 |
| TW | 201815976 A | 5/2018 |

OTHER PUBLICATIONS

Tiawanese Office Action and Search Report, dated Feb. 13, 2020, for Taiwanese Application No. 107144057.
Chatterjee et al., "Novel Thermoplastic Vulcanizates (TPVs) Based on Silicone Rubber and Polyamide Exploring Peroxide Cross-linking," eXPRESS Polymer Letters, vol. 8, No. 4, 2014, pp. 220-231.

(Continued)

*Primary Examiner* — Christopher M Rodd
(74) *Attorney, Agent, or Firm* — Birch, Stewart, Kolasch & Birch, LLP

(57) ABSTRACT

A thermoplastic vulcanizate is provided, including 10-50 parts by weight of a nylon plastic and 50-90 parts by weight of a cross-linked acrylic rubber polymer. The cross-linked acrylic rubber polymer is dispersed in the Nylon plastic. The cross-linked acrylic rubber polymer is formed by a modified acrylic rubber polymer having a hydrolysable silane group through crosslinking in the presence of water. In the modified acrylic rubber polymer having a hydrolysable silane group, a linkage group represented by formula (I) or formula (II) is between a backbone and the hydrolysable silane group:

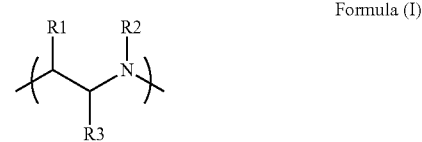

Formula (I)

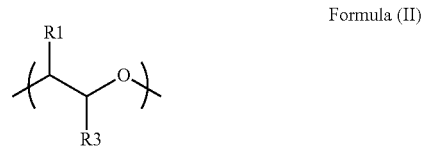

Formula (II)

wherein R1 is H or —OH; R2 is H, —Z'—Si(OR')$_3$ or C$_1$-C$_{10}$ hydrocarbon group; R3 is H or C$_1$-C$_{10}$ hydrocarbon group; Z' is a divalent bridging group; R' is individually C$_1$-C$_{10}$ hydrocarbon group. A manufacturing method of the thermoplastic vulcanizate is also provided.

20 Claims, 7 Drawing Sheets

(56) References Cited

OTHER PUBLICATIONS

Ismail et al., "Superior Heat-resistant and Oil-Resistant Blends Based on Dynamically Vulcanized Hydrogenated Acrylonitrile Butadiene Rubber and Polyarnide 12," Polym. Adv. Technol., vol. 28, 2017 (Published online Nov. 9, 2016), pp. 665-678.

Jha et al., "Effect of Fillers and Plasticizers on the Performance of Novel Heat and Oil-resistant Thermoplastic Elastomers from Nylon-6 and Acrylate Rubber Blends," Journal of Applied Polymer Science, vol. 74, 1999, pp. 1490-1501.

Jha et al., "Influence of Dynamic Vulcanization and Phase Interaction on the Swelling Behavior of the Thermoplastic Elastomeric Blends of Nylon-6 and Acrylate Rubber in Various Solvents and Oil," Journal of Applied Polymer Science, vol. 69, 1998, pp. 2331-2340.

\* cited by examiner

THERMOPLASTIC VULCANIZATE AND MANUFACTURING METHOD THEREOF

CROSS REFERENCE TO RELATED APPLICATIONS

This application claims the benefit of Taiwan Application No. 107144057 filed on Dec. 7, 2018, and entitled "Thermoplastic vulcanizate and manufacturing method thereof", the entirety of which is incorporated by reference herein.

BACKGROUND

The present disclosure relates to a thermoplastic vulcanizate and a manufacturing method thereof More specifically, the present disclosure relates to a manufacturing method of a thermoplastic vulcanizate without an organic cross-linking agent, and the thermoplastic vulcanizate made therefrom.

Thermoplastic vulcanizates (TPV) are polymeric compositions with a thermosetting elastomer dispersed in a thermoplastic matrix. Through this structure, comparing to conventional thermoplastic elastomers (TPE), thermoplastic vulcanizates have many superior characteristics such as compressibility, anti-permanent deformation, and so on. Thus, TPV can be applied in many different areas such as automobile industry, consumer electronics, wrapping materials and sealing components.

Traditional thermoplastic vulcanizates, such as ethylene propylene diene monomer (EPDM)/polypropylene (PP), still have an undesirable balance between heat resistance and oil resistance. On the other hand, in the conventional manufacturing process of TPVs, in order to crosslink the dispersed elastomers in the matrix, an organic crosslinking agent is needed to conduct the crosslinking reaction. This procedure not only causes extra pollution of the environment, but it also raises the cost of production and back-end processes.

Consequently, although there has been various lines of research and products during the development of this area, defects or problems with manufacturing methods and products remain. Accordingly, improvements in TPVs are still desirable.

SUMMARY

In accordance with some embodiments of the present disclosure, a thermoplastic vulcanizate is provided. The thermoplastic vulcanizate includes 10-50 parts by weight of a nylon plastic, and 50-90 parts by weight of a cross-linked acrylic rubber. The cross-linked acrylic rubber is dispersed in the nylon plastic; wherein the cross-linked acrylic rubber is formed by a crosslink reaction of a modified acrylic rubber with a hydrolysable silane group in presence of water. The modified acrylic rubber has a linkage between a backbone chain of the modified acrylic rubber and the hydrolysable silane group, wherein the linkage is represented as formula (I) or formula (II):

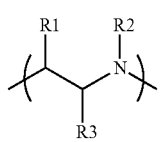

Formula (I)

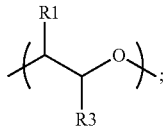

Formula (II)

wherein R1 is H or —OH; R2 is H, —Z'—Si(OR')$_3$ or a hydrocarbon group having 1-10 carbon atoms; R3 is H or a hydrocarbon group having 1-10 carbon atoms; Z' is a divalent bridge group; R' is independently a hydrocarbon group having 1-10 carbon atoms.

In accordance with some other embodiments of the present disclosure, a manufacturing method of a thermoplastic vulcanizate is provided. The manufacturing method includes mixing a nylon plastic and a modified acrylic rubber with a hydrolysable silane group to form a mixture, wherein the nylon plastic is 10-50 parts by weight and the modified acrylic rubber is 50-90 parts by weight, and using water as a crosslinking agent and in presence of a metal catalyst to form a Si—O—Si bond between the modified acrylic rubber and let the modified acrylic rubber become crosslinked. The modified acrylic rubber in the thermoplastic vulcanizate has a linkage between a backbone chain of the modified acrylic rubber and the hydrolysable silane group, and the linkage is represented as formula (I) or formula (II):

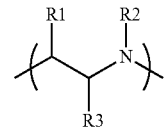

Formula (I)

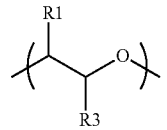

Formula (II)

wherein R1 is H or —OH; R2 is H, —Z'—Si(OR')$_3$ or a hydrocarbon group having 1-10 carbon atoms; R3 is H or a hydrocarbon group having 1-10 carbon atoms; Z' is a divalent bridge group; R' is independently a hydrocarbon group having 1-10 carbon atoms.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Below are detailed descriptions of embodiments of the present disclosure. A specific composition recited in the embodiments is merely for explanation, but not intended to limit the scope of the present disclosure. A person skilled in the art may modify or change some composition depending on actual need during implementation.

The present disclosure provides a manufacturing method of a thermoplastic vulcanizate. The method includes mixing a modified acrylic rubber with a hydrolysable silane group [A] and a nylon plastic [B], and using water as a cross-liking agent. A Si—O—Si bond will be formed between the modified acrylic rubbers and thus the modified acrylic rubbers become cross-linked to each other. Through this specific bonding to control cross-linking speed, the acrylic rubber phase may form uniform micro particles dispersed in the nylon plastic phase, and this manufacturing method does not need a conventional organic cross-linking agent. The present disclosure also provides a thermoplastic vulcanizate having a specific linkage made from the above-mentioned method. The thermoplastic vulcanizate has improved physical properties, such as improved heat resistance, oil resistance, and so on.

Figure 1:
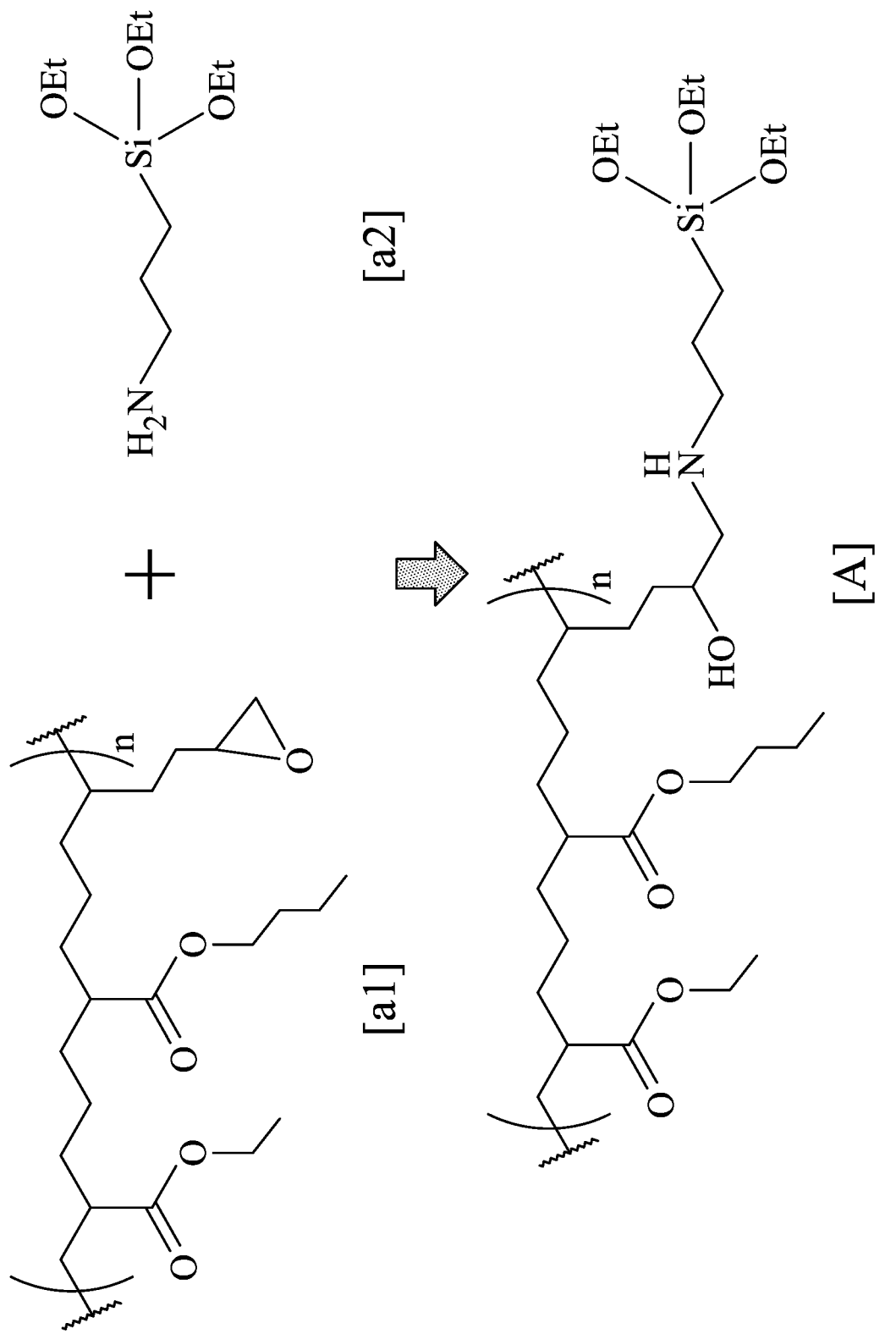
FIG. 1 illustrates a schematic diagram showing a manufacturing process of a modified acrylic rubber with a hydrolysable silane group in accordance with some embodiments of the present disclosure.
Figure 2:
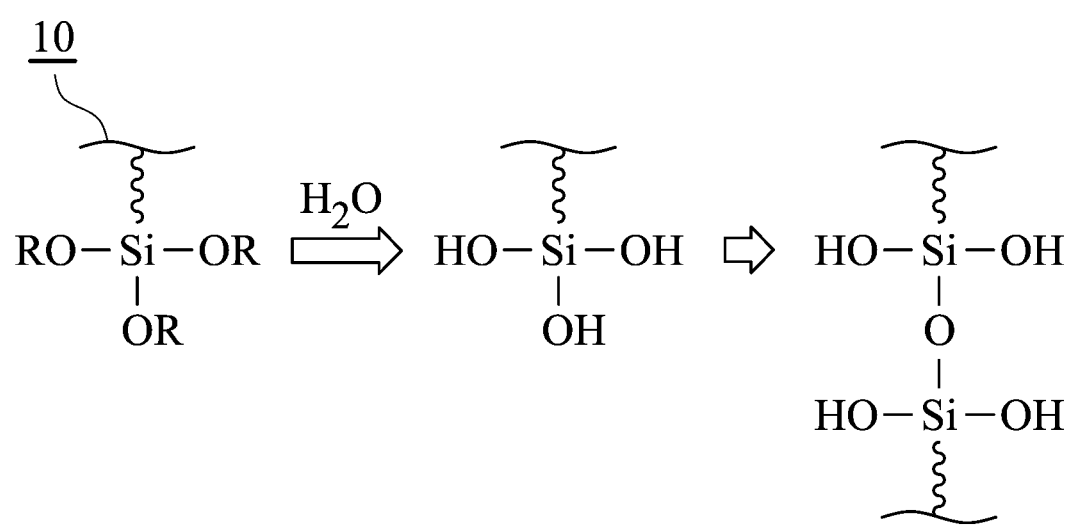
FIG. 2 illustrates a schematic diagram showing a process of forming bonds between hydrolysable silane groups through hydrolysis in accordance with some embodiments of the present disclosure.

For the purpose of explaining the present disclosure more clearly, a specific example is used herein to present an overview of the present disclosure. First, referring to FIG. 1, FIG. 1 is a schematic diagram showing a manufacturing process of a modified acrylic rubber with a hydrolysable silane group [A]. The modified acrylic rubber with a hydrolysable silane group [A] is formed by reacting an acrylic rubber with a reactive functional group [a1] with modified agent [a2], wherein the reactive functional group is a functional group may react with an amine group or a hydroxyl group to form a bond with the amine group or the hydroxyl group. The obtained modified acrylic rubber [A], as mentioned above, is mixed with nylon plastic [B] and water serving as a cross-linking agent. A Si—O—Si bond will be formed between the modified acrylic rubbers [A] and thus the modified acrylic rubbers [A] become cross-linked to each other, as shown in FIG. 2 (the remaining portions of the modified acrylic rubber [A] other than —Si(OR)$_3$ are not shown in the figure and represented by reference numeral 10). Through the cross-link, the acrylic rubber phase may formed a uniform micro-grade particles dispersed in the nylon plastic phase.

Each composition of the process will be explained in detail as below.

[a1]: Acrylic Rubber

The term "acrylic rubber" used herein is an acrylate polymer having a reactive functional group, wherein the reactive functional group may react with an amine group or a hydroxyl group to form a bond with the amine group or the hydroxyl group. In some embodiments, the reactive functional group may be a halogen or an epoxy group. The term "epoxy group" used herein means a cyclic —C(O)C— functional group.

The acrylate polymer may be polymerized from acrylate monomers or, depending on the needed properties of the acrylic polymer, may be co-polymerized from acrylate monomers with other polymerizable monomers. In other words, the acrylic polymer may be a polymer or a copolymer. The term "copolymer" used herein refers to polymers prepared by a polymerization of at least two different types of monomers.

The acrylate monomers used herein have no specific limitation. Examples of the acrylate monomer include ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, and allyl methacrylate; acrylates such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-ethylhexyl acrylate, 2-methoxyethyl acrylate, glycidyl acrylate, and allyl acrylate.

The other polymerizable monomers used herein have no specific limitations as well, as long as the monomers can polymerized with the acrylate monomers. For example, the other polymerizable monomers may be an organic monomer having terminal carbon double bonds or triple bonds, such as 3-butenoates, 4-pentenoates, styrene, isobutene, 1,3-butadiene, isoprene, and so on.

In order to prepare the acrylate polymer having a reactive functional group, such as an acrylate polymer having an epoxy group, an acrylate monomer containing an epoxy group can be used in a polymerization process in accordance with some embodiments of the present disclosure. In accordance with some other embodiments, if the other polymerizable monomer is used in the polymerization process, the epoxy group may only exist in the other polymerizable monomer. In some other embodiments, an acrylate monomer containing an epoxy group and another polymerizable monomer containing an epoxy group may be used in a polymerization process simultaneously. Through such methods, an acrylate polymer having an epoxy group ([a1] acrylic rubber) may be obtained. Forming an acrylic polymer without a reactive functional group at first, and then attaching a side chain having an epoxy group to the acrylic polymer through conventional polymer grafting techniques is also acceptable. An acrylate polymer having an epoxy group may be directly obtained from commercially available product, for example, the acrylate polymer from Zeon under the trade name Nipol® AR-31 Grade. An acrylate polymer having halogen may be directly obtained from commercially available product as well, for example, the acrylate polymer from Toa resin corporation under the trade name AR-801 Grade or the acrylate polymer from Zeon under the trade name Nipol® AR-Nipol®12.

Examples of an acrylate polymer having an epoxy group include glycidyl acrylate, glycidyl methacrylate, glycidyl 2-ethylacrylate, glycidyl 2-propylacrylate, glycidyl 2-butylacrylate, 3,4-epoxybutyl acrylate, 3,4-epoxybutyl methacrylate, 6,7-Epoxyheptyl acrylate, 6,7-epoxyheptyl methacrylate, 6,7-epoxyheptyl a-ethylacrylate, 3,4-epoxycyclohexylmethyl acrylate, 3,4-epoxycyclohexylmethyl methacrylate, and so on.

Examples of the other polymerizable monomer having an epoxy group include butadiene monoxide, 1,2-epoxy-5-hexene, 2-hex-5-enyloxirane, 1,2-epoxy-4-vinylcyclohexane, allyl glycidyl ether, and so on, which contain terminal unsaturated carbon bonds and an epoxy group.

The acrylic rubber in the present disclosure may be polymerized from suitable monomers using conventional methods, such as emulsion polymerization, suspension polymerization, solution polymerization, and so on.

In some embodiments, epoxy groups or halogen in the acrylic rubber account for 0.2-4.5 mol % of the total acrylic rubber. Preferably, epoxy groups or halogen account for 0.5-3 mol % of the total acrylic rubber. The percentage may be measured by a conventional method through Nuclear Magnetic Resonance Spectroscopy (NMR). When the contents of the reactive functional group is too low, it will result in a low content of hydrolysable silane groups in the subsequently formed modified acrylic rubber [A]. It will further lead to an insufficient degree of cross-link between the modified acrylic rubbers when forming a thermoplastic vulcanizate, such that the rubber phase in the thermoplastic vulcanizate will not have sufficient phase inversion. Insufficient phase inversion will cause poor mechanical properties (such as poor tensile strength). On the other hand, when the contents of the reactive functional group is too high, it will result in over cross-linked modified acrylic rubbers and it is difficult to control the properties of the final thermoplastic vulcanizate (for example, resulting in poor elasticity).

The term "phase inversion" used herein means a phenomenon when a mixture of rubber and plastic starts to crosslink. When the rubber and the plastic are mixed with more rubber than plastic, the small portion of plastic is a dispersed phase and the rubber is a continuous phase at the beginning. However, when the rubber phase starts to crosslink, the viscosity of the rubber phase increases significantly, and the rubber phase will be broken up into small particles through the shear force and form phase inversion. Namely, the plastic phase becomes a continuous phase and the rubber phase becomes particles dispersed in the plastic phase and thus turns into a dispersed phase. The degree of dispersal and uniformity play an important role in a thermoplastic vulcanizate. If the rubber phase does not disperse properly, properties such as tensile strength, elongation, permanent elongation will deteriorate, and further negatively affect processability, oil resistance, and so on.

In some embodiments, an acrylic polymer having an epoxy group is represented as formula (A), which may be polymerized by ethyl acrylate monomer, ethylene monomer, butyl acrylate monomer and 1,2-epoxy-5-hexene. The acrylic polymer having an epoxy group represented as formula (A) may be directly obtained from commercially available product, such as the trade name Nipol® AR-31 from Zeon. In formula (A), n is a positive integer from 1,000 to 3,000. The weight average molecular weight (Mw) may be $500\times10^3$-$700\times10^3$ g/mol; and the number average molecular weight (Mn) may be $150\times10^3$-$400\times10^3$ g/mol.

Formula (A)

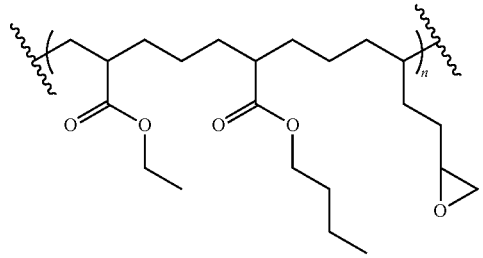

In some embodiments, an acrylic polymer having halogen is represented as formula (B), wherein Q is a halogen, such as chlorine. The acrylic polymer having halogen represented as formula (B) may be polymerized by ethyl acrylate monomer, ethylene monomer, butyl acrylate monomer and 5-chlorine-1-pentene. The acrylic polymer represented as formula (B) may be directly obtained from commercially available product, such as the trade name AR-801 Grade from Toa Resin Corporation. In formula (B), n is a positive integer from 750 to 3,000. The weight average molecular weight (Mw) may be $600\times10^3$-$1,300\times10^3$ g/mol; and the number average molecular weight (Mn) may be $100\times10^3$-$400\times10^3$ g/mol.

[a2]: [Modified Agent]

The term "modified agent" used in the present disclosure means a compound which may react with the reactive functional group in the acrylic rubber [a1] and thereby graft a hydrolysable silane group to the acrylic rubber. In some embodiments, the modified agent may be a compound having an amine group or a hydroxyl group at one terminal and having a hydrolysable silane group at the other terminal. In some embodiments, a general formula of the modified agent may be HO—Z—Si(OR)$_a$(X)$_{3-a}$, wherein Z is a divalent bridge group, such as linear or branched alkylene group, cyclic alkylene group, or ether group (—O—); R is independently a hydrocarbon group having 1-10 carbon atoms; X is independently H or a hydrocarbon group having 1-10 carbon atoms; a is an integer from 1-3. In the present disclosure, the different R in —OR groups on Si may be the same or different from each other. In some embodiments, Z is an alkylene group having 1-6 carbon atoms; X is H or a hydrocarbon group having 1-6 carbon atoms; R is a hydrocarbon group having 1-6 carbon atoms. In some embodiments, Z is propylene; R is methyl or ethyl; a is 3 in the general formula HO—Z—Si(OR)$_a$(X)$_{3-a}$. In some embodiments, a general formula of the modified agent may be R2-HN—Z—Si(OR)$_a$(X)$_{3-a}$, wherein R2 is H or a hydrocarbon group having 1-10 carbon atoms; X is independently H or a hydrocarbon group having 1-10 carbon atoms; R is independently a hydrocarbon group having 1-10 carbon atoms; a is an integer from 1-3. In some embodiments, R2 may be —Z'—Si(OR')$_3$, wherein Z' is a divalent bridge group, such as linear or branched alkylene group, cyclic alkylene group, or ether group (—O—); R' is independently a hydrocarbon group having 1-10 carbon atoms. In some embodiments, Z' is an alkylene group having 1-6 carbon atoms; R' is a hydrocarbon group having 1-6 carbon atoms in the general formula —Z'—Si(OR')$_3$, for example, R' may be a linear or branched alkyl group, such as methyl, ethyl, propyl, isopropyl, n-butyl, t-butyl, sec-butyl, isobutyl, pentyl or hexyl. In some embodiments, Z is an alkylene group having 1-6 carbon atoms; X is H or a hydrocarbon group having 1-6 carbon atoms; R is a hydrocarbon group having 1-6 carbon atoms in the general formula R2-HN—Z—Si(OR)$_a$(X)$_{3-a}$. In some embodiments, Z is propylene; R is methyl or ethyl; a is 3 in the general formula R2-HN—Z—Si(OR)$_a$(X)$_{3-a}$.

The exemplary modified agent may be γ-amino propyl trimethoxy silane; γ-amino propyl triethoxy silane; γ-amino propyl methyl diethoxy silane; 4-amino-3,3-dimethyl butyl triethoxy silane, 4-amino-3,3-dimethylbutylmethylediethoxysilane, N-beta-(aminoethyl)-γ-aminopropyltrimeth-oxysilane, $H_2NCH_2CH_2NHCH_2CH_2NH(CH_2)_3Si(OCH_3)_3$ or N-beta-(aminoethyl)-γ-aminopropylmethyldimethoxysilane. Other suitable amino silanes are as follows: 3-(2-aminoethylamino)propyl-dimethoxymethylsilane, 3-(N-allylamino)propyltrimethoxysilane, 4-aminobutyltriethoxysilane, 4-aminobutyltrimethoxysilane, triamino-functional propyltrimethoxysilane, (aminoethylaminomethyl)-phenethyltrimethoxysilane, aminophenyltrimethoxysilane, 3-(1-aminopropoxy)-3,3,dimethlyl-1-propenyltrimethoxysilane, bis[(3-trimethoxysilyl)-propyl] ethylenediamine, N-methyl-aminopropyltrimethoxysilane, bis-(γ-triethoxysilylpropyl)amine, and N-phenyl-γ-aminopropyltrimethoxysilane.

[A]: Modified Acrylic Rubber Having Hydrolysable Silane Group

Traditionally, different kinds of organic crosslink agent will be used during a crosslink reaction between rubbers. For instances, the organic crosslink agent may be hexamethylene diamine carbamate (DIAK), N,N'-m-phenylene dismaleimide (HVA-2), and trithiocyanuric acid. These crosslink agents, however, will result in an overly fast crosslinking between rubbers under a high temperature (such as the melt point of a nylon plastic), making the crosslink reaction hard to control and resulting in a thermoplastic vulcanizate with undesirable properties. In the present disclosure, a hydrolysable silane group and water serving as a crosslink agent are used. It makes the modified acrylic rubber may crosslink each other relatively mildly under the high temperature, and thus further results in obtaining a thermoplastic vulcanizate with a better dispersion and preferable properties.

The term "hydrolysable silane group" used herein means a group including —Si(OR)$_a$X$_{3-a}$, wherein a is an integer from 1-3; R is independently a hydrocarbon group having 1-10 carbon atoms; X is independently H or a hydrocarbon group having 1-10 carbon atoms. In some embodiments, R is independently a hydrocarbon group having 1-6 carbon atoms; X is independently H or a hydrocarbon group having 1-6 carbon atoms. Under the presence of water, the —OR groups on Si in —Si(OR)$_a$X$_{3-a}$ will be hydrolyzed and turned into —OH group. A Si—O—Si bond may be formed between adjacent —Si—OH and a siloxane will be obtained. Referring to FIG. 2, it illustrates a schematic diagram showing a process of forming a bond between hydrolysable silane groups through hydrolysis. In some embodiments, when a is equal to 1, the —OR groups on different Si still can be crosslinked each other, but the degree of the crosslinking will become lower. In some embodiments, in order to gain a better degree of crosslinking between rubbers, a is 2 or 3. In the present disclosure, the term "hydrocarbon group" means any group consisting of carbon and hydrogen, or a substituted hydrocarbon group. The term "substituted hydrocarbon group" means a group consisting of carbon and hydrogen may further have a substitution group selected from hydroxyl, alkyl halide, benzoyl, alkoxyl, carboxyl, amido, amine group, and alkylamine group. In some embodiments, hydrocarbon group may be an alkyl group, alkene group, a alkyne group, or aromatic group. For example, a linear, branched or cyclic alkyl group, such as methyl, ethyl, n-propyl, isopropyl, n-butyl, isobutyl, sec-butyl, tert-butyl, n-pentyl, 1-methyl butyl group, 1-ethyl propyl, neopentyl, n-hexyl, 1-methylpentyl, 2-methylpentyl, 1-ethyl butyl, 2-ethyl butyl, n-heptyl, 1-methylhexyl, 2-methylhexyl, 1-ethylpentyl, 1-propyl butyl, 2-ethylpentyl, n-octyl, 1-methylheptyl, 2-methylheptyl, 1-ethylhexyl, 2-ethylhexyl, 1-propyl pentyl, 2-propyl pentyl and n-nonyl, n-propyl, n-butyl, cyclopentyl, cyclohexyl and cycloheptyl; or vinyl, 1-propenyl, 1-butenyl. In some embodiments, —Si(OR)$_a$X$_{3-a}$ may be —Si(OEt)$_3$.

In some embodiments, the hydrolysable silane group accounts for 0.5-5 wt % of the total weight of the modified acrylic rubber with the hydrolysable silane group, which is measured by thermogravimetric analyzer (TGA). In some embodiments, the hydrolysable silane group may account 2-4 wt %. If the content of the hydrolysable silane group is too high, it will cause the rubber phase formed afterward to over cross-link. If the content of the hydrolysable silane group is too low, it may result in an insufficient degree of cross-link of the rubber phase formed afterward and thus affect the properties of a final product.

[Manufacturing Process of Modified Acrylic Rubber with the Hydrolysable Silane Group]

In the present disclosure, the "modified acrylic rubber with the hydrolysable silane group" is formed by reacting an acrylic rubber with a reactive functional group (such as halogen or an epoxy group) [a1] with modified agent [a2].

In the present disclosure, the "modified acrylic rubber with a hydrolysable silane group" sometimes is represented shortly as "a modified acrylic rubber" or "an acrylic rubber after modification". These words are interchangeable.

In some embodiments, the modified acrylic rubber with a hydrolysable silane group is obtained from an acrylic polymer having an epoxy group or a halogen reacting with a terminal amine group or a hydroxyl group in a modified agent to graft the hydrolysable silane group. Therefore, the modified acrylic rubber with a hydrolysable silane group, between a backbone chain and the hydrolysable silane group, has a linkage represented as formula (I) or formula (II):

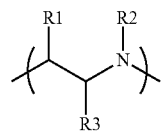

Formula (I)

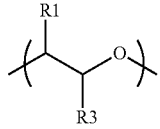

Formula (II)

wherein R1 is H or —OH; R2 is H, —Z'—Si(OR')$_3$ or a hydrocarbon group having 1-10 carbon atoms; R3 is H or a hydrocarbon group having 1-10 carbon atoms; Z' is a divalent bridge group, such as a linear or branched alkylene group, cyclic alkylene group, or ether group (—O—); R' is independently a hydrocarbon group having 1-10 carbon atoms.

In some other embodiments, R3 is H or a hydrocarbon group having 1-6 carbon atoms; R2 is H, —Z'—Si(OR')$_3$ or a hydrocarbon group having 1-6 carbon atoms; Z' is an alkylene group having 1-6 carbon atoms; R' is independently a hydrocarbon group having 1-6 carbon atoms. In the modified acrylic rubber with a hydrolysable silane group, the N atom in formula (I) and the O atom in formula (II) are closer to the hydrolysable silane group; the C atom attached to R1 is farther from the hydrolysable silane group. The term "close" used herein means there are fewer chemical bonds between them.

In some embodiments of the present disclosure, the modified acrylic rubber with a hydrolysable silane group is obtained from an acrylic polymer having an epoxy group or a halogen reacting with a modified agent having a general formula R2-HN—Z—Si(OR)$_a$(X)$_{3-a}$. Thus, the modified acrylic rubber with a hydrolysable silane group as a side chain has a structure represented as formula (III):

Formula (III)

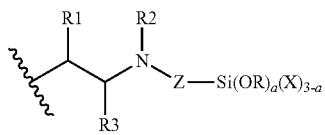

wherein R1 is H or —OH; R2 is H, —Z'—Si(OR')$_3$ or a hydrocarbon group having 1-10 carbon atoms; Z' is a divalent bridge group, such as a linear or branched alkylene group, cyclic alkylene group, or ether group (—O—); R' is independently a hydrocarbon group having 1-10 carbon atoms; Z is a divalent bridge group, such as a linear or branched alkylene group, cyclic alkylene group, or ether group (—O—); R is independently a hydrocarbon group having 1-10 carbon atoms; X is independently H or a hydrocarbon group having 1-10 carbon atoms; R3 is H or a hydrocarbon group having 1-10 carbon atoms. In some embodiments, R2 is H, —Z'—Si(OR')$_3$ or a hydrocarbon group having 1-6 carbon atoms; Z' is an alkylene group; R' is independently a hydrocarbon group having 1-6 carbon atoms; R3 is H or a hydrocarbon group having 1-6 carbon atoms; Z is an alkylene group having 1-6 carbon atoms; X is independently H or a hydrocarbon group having 1-6 carbon atoms; R is a hydrocarbon group having 1-6 carbon atoms. In some embodiments, R2 is H; Z is propylene; R is methyl or ethyl; a is 3 in R2-HN—Z—Si(OR)$_a$(X)$_{3-a}$.

In some embodiments, the modified acrylic rubber with a hydrolysable silane group is obtained from an acrylic polymer having an epoxy group or a halogen reacting with a modified agent having a general formula HO—Z—Si(OR)$_a$(X)$_{3-a}$. Thus, the modified acrylic rubber with a hydrolysable silane group as a side chain has a structure represented as formula (IV):

formula (IV)

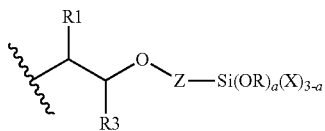

wherein R1 is H or —OH; Z is a divalent bridge group, such as a linear or branched alkylene group, cyclic alkylene group, or ether group (—O—); R is independently a hydrocarbon group having 1-10 carbon atoms; X is independently H or a hydrocarbon group having 1-10 carbon atoms; R3 is H or a hydrocarbon group having 1-10 carbon atoms. In some embodiments, R3 is H or a hydrocarbon group having 1-6 carbon atoms; Z is an alkylene group having 1-6 carbon atoms; X is independently H or a hydrocarbon group having 1-6 carbon atoms; R is a hydrocarbon group having 1-6 carbon atoms. In some embodiments, Z is propylene; R is methyl or ethyl; a is 3 in HO—Z—Si(OR)$_a$(X)$_{3-a}$.

In some embodiments, a modified acrylic rubber with a hydrolysable silane group having formula (I) may contain a repeating unit represented as formula (C):

Formula (C)

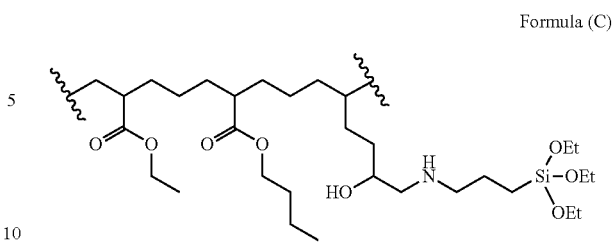

In some embodiments, a modified acrylic rubber with a hydrolysable silane group having formula (II) may contain a repeating unit represented as formula (D):

Formula (D)

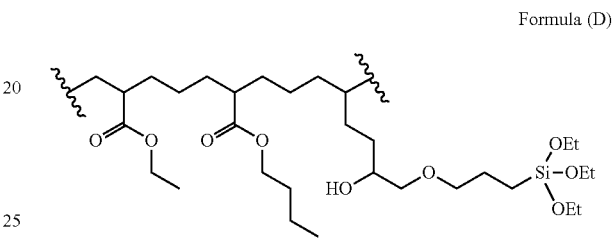

The manufacturing method of the modified acrylic rubber with a hydrolysable silane group has no specific limitation. In some embodiments, the modified acrylic rubber with a hydrolysable silane group may be formed form mixing an acrylic rubber with a modified agent. For example, the modified acrylic rubber with a hydrolysable silane group may be obtained from mixing an acrylic rubber and a modified agent in a kneader reactor. In some embodiments, 100 parts by weight of an acrylic rubber and 2-8 parts by weight of a modified agent may be mixed to form the modified acrylic rubber.

[B]: [Nylon Plastic]

The term "nylon plastic" used in the present disclosure is a polyamide (PA), which means a polymer containing a repeating unit of —CONH—. An appropriate nylon plastic may be a commercial product or formed by conventional polymerization methods, such as an addition polymerization and a self-condensation. For example, it may be a self-condensation of an amino acid or a lactam. The nylon plastic in the present disclosure may be an aliphatic polymer or include an aromatic unit. The nylon plastic in the present disclosure may be a polymer or a copolymer. The nylon plastic in the present disclosure may be only one kind of polyamide or a mixture of more than one polyamide. The polyamide may be modified, which means a polyamide including other substitution group.

In some embodiments, the appropriate polyamide may include nylon 6, nylon 66, nylon 12, nylon 46, nylon 610, nylon 11, nylon 612 or a combination thereof.

[Manufacturing Method of Thermoplastic Vulcanizate]

In accordance with some embodiments of the present disclosure, a manufacturing method of a thermoplastic vulcanizate is provided. The manufacturing method may include steps as below: mixing a nylon plastic and a modified acrylic rubber with a hydrolysable silane group to form a mixture; then, under the present of a metal catalyst, using water as a crosslink agent to form a Si—O—Si bond between the modified rubber in the mixture, which lets the modified acrylic rubber disperse effectively and evenly in the nylon plastic.

In some embodiments, the manufacturing method of a thermoplastic vulcanizate may be a dynamic crosslinking process. The term "dynamic crosslinking process" means during a rubber material and a plastic material being melted and mixed, the mixture are blended with a cross linking agent to form cross-link between the rubber materials. The term "dynamic" means applying a sheer force to the mixture during cross-link process. Comparing to above, "static crosslinking process" means the mixture stay in a static state (relative to a fixed space) during the crosslinking process. To let the rubber material and the plastic material melt and mix more evenly, a temperature during the mixing process may be adjusted to between the melt temperature and the decompose temperature of the plastic material. In some embodiments, when the plastic material is a nylon plastic, the temperature of the process may be 180-300° C., preferably 200-280° C. Even at this temperature, which is higher than the traditional TPV manufacturing process, since the hydrolysable silane group disclosed in the present disclosure is utilized to crosslink, the crosslinking process will be more moderate and controllable. Thus, the TPV will not crosslink excessively and the desirable physical mechanic properties of the TPV will not be affected.

The dynamic crosslinking process may be conducted by any suitable mixing device. The mixing device includes a roll mill, a meshing rotor mixer, a tangential rotor mixer (such as a Banbury mixer and Brabender mixer) and a continuous mixer (such as an extruder, especially a twin screw extruder).

The term "mix" means a process of utilizing mechanical activity to blend a rubber and a plastic with or without other accessory ingredient evenly. The mixing process may be conducted non-continuously or in batches. The rotating speed of the mixing device during the mixing process may be adjusted according to need, but should be controlled to remain within a proper range, without being too low or too high. In some embodiments, the rotating speed may be 150-400 revolutions per minute (rpm). If the rotating speed is too low, it may result a rubber and a plastic blend unevenly with each other. If the rotating speed is too high, it may cause the temperature of the mixing device to rise excessively and thus make the whole temperature hard to control.

In order to let a TPV form phase inversion effectively when the rubbers crosslink each other afterwards, based on the total weight of the nylon plastic and the modified acrylic rubber, the modified acrylic rubber accounts for about 50wt % or more, and the nylon plastic accounts for about 50wt % or less. Preferably, the modified acrylic rubber accounts for about 60-80 wt % and the nylon plastic accounts for about 20-40 wt %. In some embodiments, the TPV contains 10-50 parts by weight of the nylon plastic and 50-90 parts by weight of the cross-linked acrylic rubber. More preferably, the TPV contains 20-40 parts by weight of the nylon plastic and 60-80 parts by weight of the cross-linked acrylic rubber.

In some embodiments, the metal catalyst may be a catalyst containing tin, a catalyst containing rhenium, or a catalyst containing indium. In some embodiments, the catalyst containing tin may be dibutyltin dilaurate, dibutyltin dilaurate (???), or dibutyltin dioctanoate, which may catalyze forming a Si—O—Si bond between alkoxysilanes. Preferably, the catalyst containing tin is dibutyltin dilaurate. The adding method of the metal catalyst does not have a specific limitation. In some embodiments, the metal catalyst may be mixed with a modified acrylic rubber and a nylon plastic at the same time at a beginning of a mixing process. The metal catalyst may also be mixed with a modified acrylic rubber at first to form a rubber masterbatch, and then the rubber masterbatch is mixed with a nylon plastic afterwards. Alternatively, a nylon plastic and a modified rubber may be mixed at first, and the metal catalyst is added in afterwards. In some embodiments, based on the total weight of a modified acrylic rubber with a hydrolysable silane group, the additive amount of metal catalyst is 0.1-3 wt %, preferably is 0.5-1.5 wt %. In some other embodiments, a modified acrylic rubber with a hydrolysable silane group is 100 parts by weight, and the additive metal catalyst is 0.1-3 parts by weight or 0.5-1.5 parts by weight. In some embodiments, the mixing process may be conducted without the metal catalyst to perform a crosslinking process, but a degree of crosslink of a product might decrease.

In some embodiments, a nylon plastic, a modified acrylic rubber and water may be mixed at the same time. In some other embodiments, water may be added to the mixer after a nylon plastic and a modified rubber have been mixed evenly, which may further help the modified acrylic rubber will not be over crosslinked each other at first and be dispersed in the nylon plastic more evenly. The temperature and pressure in the mixer may be maintained to keep the water at a superheated condition to perform a reaction. The water in the present disclosure is not limited to specific form. It may be some other thing that may contain water and release the water in the manufacturing process, such as a hydrate including water, a compound may absorb water, and so on. For example, it may be aluminium trihydrate, aluminium hydroxide, or magnesium hydroxide. In some embodiments, when a modified acrylic rubber is 100 parts by weight, an additive amount of water in the mixing process may be 10 parts by weight.

After the crosslink is finished, the water in the mixture may be removed by low pressure or so on. Then, the mixture may be granulated by, for example, a water ring pelletizer, a (hot cutting) die face cutting pelletizer or combining a water ring pelletizer with a strand pelletizer. The pelletized particles then are dried and particles of a thermoplastic vulcanizate are obtained. The drying method used in the present disclosure has no specific limitation. Any suitable drying device may be used to dry the moist cross-linked thermoplastic vulcanizates. For example, using a contact drier, a paddle driers, a pan drier or so on. Suitable drying device may be, but not limited to, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used. Equally suitable is a downstream drier, for example a shelf drier, a rotary tube oven or a heatable screw.

[Thermoplastic Vulcanizates]

The present disclosure provides a thermoplastic vulcanizate. The term "thermoplastic vulcanizate" used herein means a vulcanizate that a cross-linked elastomer phase (such as a rubber phase) is dispersed in a thermoplastic plastic material. The thermoplastic vulcanizate at least includes a thermoplastic material and a cross-linked elastic material. The thermoplastic material forms a matrix or a continuous phase, and the cross-linked elastic material forms a discontinuous phase. In other words, the cross-linked elastomer is dispersed in the thermoplastic matrix. In some specific embodiments, a cross-linked elastomer may be dispersed in a continuous phase made by a thermoplastic material evenly or unevenly.

The term "vulcanizate" or "vulcanization" means a process of forming chemical bonds between rubber molecules and the rubber molecules crosslinking each other to form a 3-dimension (3D) network structure. Therefore, "vulcanizate(s)" or "vulcanized rubber" in the present disclosure means an elastomer or a rubber having a 3D network structure between rubber molecules. In the present disclosure, "vulcanize" and "crosslink" are synonyms.

In some embodiments of the present disclosure, the thermoplastic vulcanizate has a cross-linked acrylic rubber phase and a nylon plastic phase, wherein the cross-linked acrylic rubber phase is formed by a modified acrylic rubber with a hydrolysable silane group through crosslink process under a present of water, and the thermoplastic vulcanizate has a linkage between a backbone chain of the modified acrylic rubber and a hydrolysable silane group in the modified acrylic rubber, wherein the linkage is represented as formula (I) or formula (II):

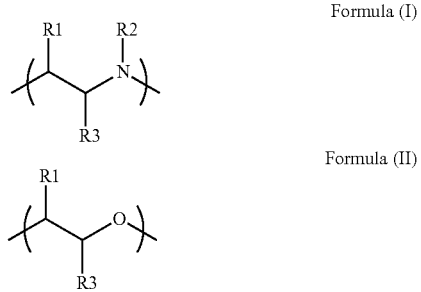

Formula (I)

Formula (II)

wherein R1 is H or —OH; R2 is H, —Z'—Si(OR')$_3$ or a hydrocarbon group having 1-10 carbon atoms; R3 is H or a hydrocarbon group having 1-10 carbon atoms; Z' is a divalent bridge group, such as a linear or branched alkylene group, cyclic alkylene group, or ether group (—O—); R' is independently a hydrocarbon group having 1-10 carbon atoms.

In some other embodiments, Z' is a hydrocarbon group having 1-6 carbon atoms; R' is independently a hydrocarbon group having 1-6 carbon atoms. In the modified acrylic rubber with a hydrolysable silane group, the N atom in formula (I) and the O atom in formula (II) are closer to the hydrolysable silane group; the C atom attached to R1 is farther from the hydrolysable silane group. The term "close" used herein means there are fewer chemical bonds between them.

The acrylic rubber reacts with a modified agent having an amine group or a hydroxyl group at one terminal and having a hydrolysable silane group at the other terminal through a group which may react with an amine group or a hydroxyl group to form a bond with the amine group or the hydroxyl group, such as epoxy group or halogen, on itself. By this reaction, a hydrolysable silane group can be introduced into the acrylic rubber to form a modified acrylic rubber. Then, Si—O—Si bonds may be formed between the modified acrylic rubbers through hydrolysis and the modified acrylic rubbers become cross-linked. Through a shear force resulting from the crosslink reaction, the originally continuous rubber phase is dispersed in the nylon plastic phase, and thus a phase inversion is formed.

When the group which may react with an amine group or a hydroxyl group to form a bond with the amine group or the hydroxyl group on the acrylic rubber is an epoxy group or halogen, a reaction mechanism of reacting with a modified agent to graft silane group successively is different from conventional radical mechanism, which is traditionally used in a grafting reaction. For example, using peroxides as a radical initiator. Since radicals are highly reactive species, it is hard to control the reaction rate and it is easy to cause other side reactions as well, such as recombination between radicals, radicals attacking a rubber backbone to break the chain and so on. Those are adverse factors for forming a thermoplastic vulcanizate. Contrarily, through using epoxy groups and halogens to modify an acrylic rubber, the reaction rate of the modification may be controlled more effectively and with limited side reactions. It may lead to a better control of the products quality or may not need additional purifying process and thus the cost of time and money may be reduced.

In some embodiments, based on the total weight of the nylon plastic and the modified acrylic rubber, the modified acrylic rubber accounts for about 50 wt % or more, and the nylon plastic accounts for about 50 wt % or less. Preferably, the modified acrylic rubber accounts for about 60-80 wt % and the nylon plastic accounts for about 20-40 wt %. In some embodiments, the TPV contains 10-50 parts by weight of the nylon plastic and 50-90 parts by weight of the cross-linked acrylic rubber. More preferably, the TPV contains 20-40 parts by weight of the nylon plastic and 60-80 parts by weight of the cross-linked acrylic rubber.

An average particle diameter or shape of the acrylic rubber dispersed phase in the thermoplastic vulcanizate of the present disclosure has no specific limitations. Preferably, the shape may be a substantially sphere, which may let the thermoplastic vulcanizate possess better mechanical properties, such as low permanent deformation in compression. A desirable average diameter of the particles may be 1-5 μm, preferably be 2-3 μm. If the size of the cross-linked rubber phase particles is too large, the properties of the thermoplastic vulcanizate may be deteriorated.

Properties of the thermoplastic vulcanizate in the present disclosure may be adjusted by some additives used in the art. The additives may be carbon black, clay, titanium dioxide, fillers (such as calcium carbonate), pigments, reinforcing agents, vulcanizing accelerators, antioxidants (such as hindered phenols, thioesters, phosphites), stabilizers, lubricants, foaming agents, plasticizers, extenders, and discontinuous fibers (such as short glass fiber, short cellulose fiber). The additive amount of additive is not limited specifically, as long as the physical properties of the thermoplastic vulcanizate will not be significantly affected. The amount of additive added is based on the principle that the physical properties of the thermoplastic vulcanizate are not excessively affected. In some embodiments, the additive amount of each additive is 0.5-5 wt %, preferably 0.5-2 wt %, based on the total weight of the thermoplastic vulcanizate.

The terms "about" and "substantially" typically mean +/– 5% of the stated value, more typically mean +/– 3% of the stated value, more typically +/– 1% of the stated value, and even more typically +/– 0.5% of the stated value. The stated value of the present disclosure is an approximate value. When there is no specific description, the stated value includes the meaning of "about" or "substantially".

Since the manufacturing method of thermoplastic vulcanizates and the thermoplastic vulcanizates made thereof provided in the present disclosure utilize specific linkage and hydrolysable silane groups to crosslink, a mild crosslink reaction still can be processed at relatively high temperature. Thus, the morphology of the thermoplastic vulcanizate may be controlled effectively, and by which a better heat-resistance and oil-resistance of the thermoplastic vulcanizate may be obtained and the thermoplastic vulcanizate may be applied in various sealing materials. For example, the sealing materials may be gaskets for valve or oil tubes. The manufacturing method needs no organic crosslinking agent, which may further reduce the pollution of the whole manufacturing process.

Examples and comparative examples are recited below to explain characteristics of the thermoplastic vulcanizate in the present disclosure:

Preparation Example 1

[preparing a Modified Acrylic Rubber Masterbatch of the Modified Acrylic Rubber with a Hydrolysable Silane Group]

100 parts by weight of an acrylic rubber (from Zeon under the trade name Nipol® AR-31 Grade) (the epoxy group content of which is 3.1 mol %), 5 parts by weight of (3-Aminopropyl) triethoxysilane (Acros, 919-30-2) serving as a modified agent, 1 part by weight of dibutyltin dilaurate (Acros, 77-58-7) serving as a metal catalyst were added into a dispersion kneader (from Jian Kwang Machine, type name JKM-DK10), and the mixture was kneaded at 150° C., 50-100 rpm for 20 minutes. Afterwards, the mixture was pelletized by a pelletizer (type name GZML-110L-150) at 50-100° C. and a rotation rate of the screw was 20 rpm. A modified acrylic rubber masterbatch containing a metal catalyst is obtained.

The modified acrylic rubber in preparation example 1 was analyzed by a thermogravimetric analyzer (type name TPA Q500). The content of the hydrolysable silane group accounts for 3 wt % of the total weight of the modified acrylic rubber.

Example 1

100 parts by weight of the modified acrylic rubber masterbatch containing a metal catalyst from preparation example 1 and 100 parts by weight of nylon 6 (Formosa chemicals & fibre corporation, 6N) serving as nylon plastic particles (the weight ratio between the rubber phase and the plastic phase is about 50:50) were fed into a twin-screw extruder (Coperion, ZSK 26⌀, L/D=60) to mix. The temperature of the screws was set to 200-260° C. and the rotation rate of the screws was set to be 150-400rpm. During the mixing process of the rubber and the plastic, 10 parts by weight of water is added into the twin-screw extruder to conduct a dynamic crosslinking reaction. The crosslinking process was continued for about 10 minutes, and then the water in the mixture was removed from the product by low pressure (<0.1 bar). The product was further pelletized by a water ring pelletizer (Song Ming, SM-90U). The obtained particles were dried at 80-100° C. for about 8 hours to form a thermoplastic vulcanizate 1.

Example 2

A manufacturing process that was similar to the one in Example 1 was conducted except that the content of the modified acrylic rubber masterbatch containing a metal catalyst from preparation example 1 was 100 parts by weight and the content of the nylon plastic particles was change to 66.6 parts by weight (the weight ratio between the rubber phase and the plastic phase was about 60:40). A thermoplastic vulcanizate 2 was thus obtained.

Example 3

A manufacturing process that was similar to the one in Example 1 was conducted except that the content of the modified acrylic rubber masterbatch containing a metal catalyst from preparation example 1 was 100 parts by weight and the content of the nylon plastic particles was change to 53.8 parts by weight (the weight ratio between the rubber phase and the plastic phase was about 65:35). A thermoplastic vulcanizate 3 was thus obtained.

Example 4

A manufacturing process that was similar to the one in Example 1 was conducted except that the content of the modified acrylic rubber masterbatch containing a metal catalyst from preparation example 1 was 100 parts by weight and the content of the nylon plastic particles was change to 42.8 parts by weight (the weight ratio between the rubber phase and the plastic phase was about 70:30). A thermoplastic vulcanizate 4 was thus obtained.

Example 5

A manufacturing process that was similar to the one in Example 1 was conducted except that the content of the modified acrylic rubber masterbatch containing a metal catalyst from preparation example 1 was 100 parts by weight and the content of the nylon plastic particles was change to 25 parts by weight (the weight ratio between the rubber phase and the plastic phase was about 80:20). A thermoplastic vulcanizate 5 was thus obtained.

Example 6

A manufacturing process that was similar to the one in Example 4 was conducted. The content of the modified acrylic rubber masterbatch containing a metal catalyst from preparation example 1 was 100 parts by weight and the content of the nylon plastic particles was 42.8 parts by weight (the weight ratio between the rubber phase and the plastic phase was about 70:30). The difference is that the dibutyltin dilaurate serving as a metal catalyst was 1.5 parts by weight. A thermoplastic vulcanizate 6 was thus obtained.

Comparative Example A 100 parts by weight of the acrylic rubber (Zeon, AR-31 Grade) (the epoxy group content of which is 3.1 mol %) without being modified, 42.8 parts by weight of Nylon 6 (Formosa chemicals & fibre corporation, 6N) serving as nylon plastic particles (the weight ratio between the rubber phase and the plastic phase was about 70:30) and 1.5 parts by weight of a conventional crosslinking agent, hexamethylene diamine carbamate (DIAK) were fed into a twin-screw extruder (Coperion, ZSK 26⌀, L/D=60) to mix. The temperature of the screws was set to be 200-260° C. and rotation rate of the screws was set to be 150-400rpm. After mixing for about 1 minute, the mixture was further pelletized by a water ring pelletizer (Song Ming, SM-90U). The obtained particles were dried at 80-100° C. for about 8 hours to form an elastomer A.

Comparative Example B 100 parts by weight of the acrylic rubber (Zeon, AR-31 Grade) (the epoxy group content of which was 3.1 mol %) without being modified and 66.6 parts by weight of Nylon 6 (Formosa chemicals & fibre corporation, 6N) serving as nylon plastic particles (the weight ratio between the rubber phase and the plastic phase was about 60:40) were fed into a twin-screw extruder (Coperion, ZSK 26⌀, L/D=60) to mix. The temperature of the screws was set to be 200-260° C. and the rotation rate of the screws was set to be 150-400rpm. After mixing for about 1 minute, the mixture was further pelletized by a water ring pelletizer (Song Ming, SM-90U).

The obtained particles were dried at 80-100° C. for about 8 hours to form an elastomer B.

Comparative Example C

A manufacturing process that was similar to the one in Comparative example B was conducted except that the acrylic rubber was 100 parts by weight and the nylon plastic particles were 42.8 parts by weight (the weight ratio between the rubber phase and the plastic phase was about 70:30). An elastomer C was obtained through this process.

Comparative Example D

A manufacturing process that was similar to the one in Comparative example B was conducted except that the acrylic rubber was 100 parts by weight and the nylon plastic particles were 25 parts by weight (the weight ratio between the rubber phase and the plastic phase was about 80:20). An elastomer D was thus obtained.

The experimental conditions of Example 1-7 and Comparative example A-D are summarized as shown below in Table 1.

TABLE 1

| No. | Acrylic rubber (parts by weight) | Nylon plastic (parts by weight) | the weight ratio between the rubber phase and the plastic phase | hydrolysable silane group | Metal catalyst (parts by weight) | DIAK (parts by weight) |
|---|---|---|---|---|---|---|
| Example 1 | 100 | 100 | 50:50 | 3 wt % | 1 | — |
| Example 2 | 100 | 66.6 | 60:40 | 3 wt % | 1 | — |
| Example 3 | 100 | 53.8 | 65:35 | 3 wt % | 1 | — |
| Example 4 | 100 | 42.8 | 70:30 | 3 wt % | 1 | — |
| Example 5 | 100 | 25 | 80:20 | 3 wt % | 1 | — |
| Example 6 | 100 | 42.8 | 70:30 | 3 wt % | 1.5 | — |
| Comparative example A | 100 | 42.8 | 70:30 | — | — | 1.5 |
| Comparative example B | 100 | 66.6 | 60:40 | — | — | — |
| Comparative example C | 100 | 42.8 | 70:30 | — | — | — |
| Comparative example D | 100 | 25 | 80:20 | — | — | — |

[Assessment of Thermoplastic Vulcanizate]

Properties of each of the thermoplastic vulcanizates 1-6 from Examples 1-6 and elastomers A-D from Comparative examples A-D respectively were measured and compared. The properties include (1) surface hardness (shore D, measured in accordance with ASTM D2240); (2) tensile strength (Kg/cm$^2$, measured in accordance with ASTM D412); (3) oil resistance (%, volume change rate and weight change rate measured in accordance with ASTM IRM903 for 720 hours); and (4) heat resistance (%, maintains rate of mechanical strength measured in accordance with ASTM D3854-90 for 720 hours). The outcomes are summarized as shown below in Table 2.

TABLE 2

Figure 3A:
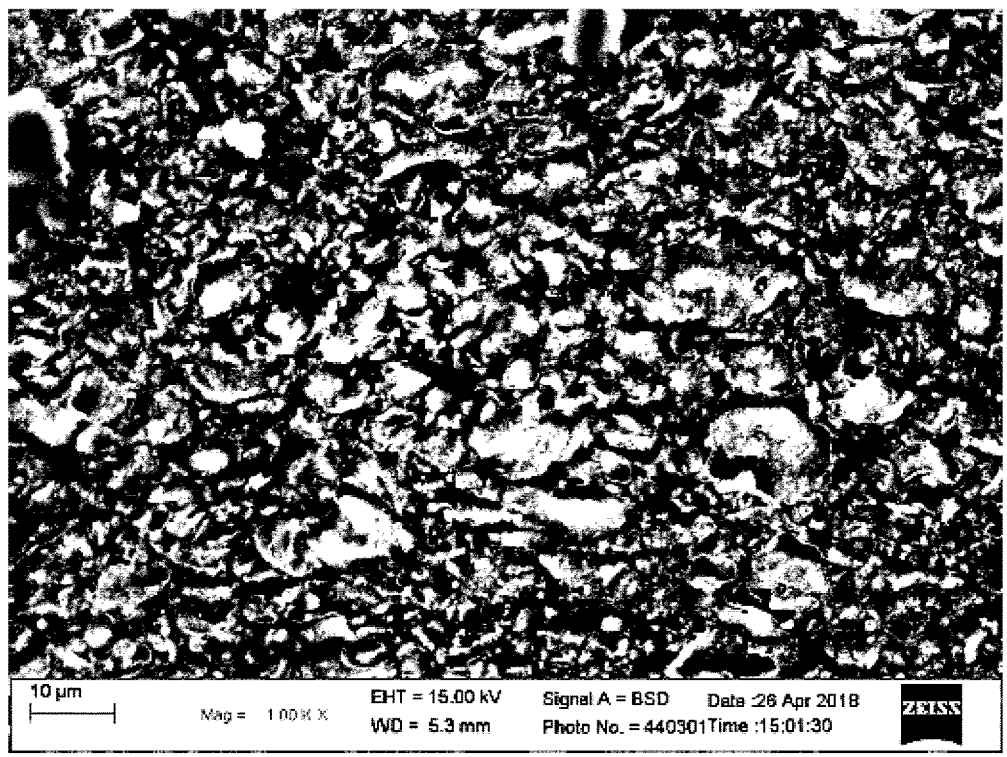
FIGS. 3A-3F are scanning electron microscope (SEM) photos of a detail structure of TPVs made from experiments in accordance with some embodiments of the present disclosure.
Figure 3B:
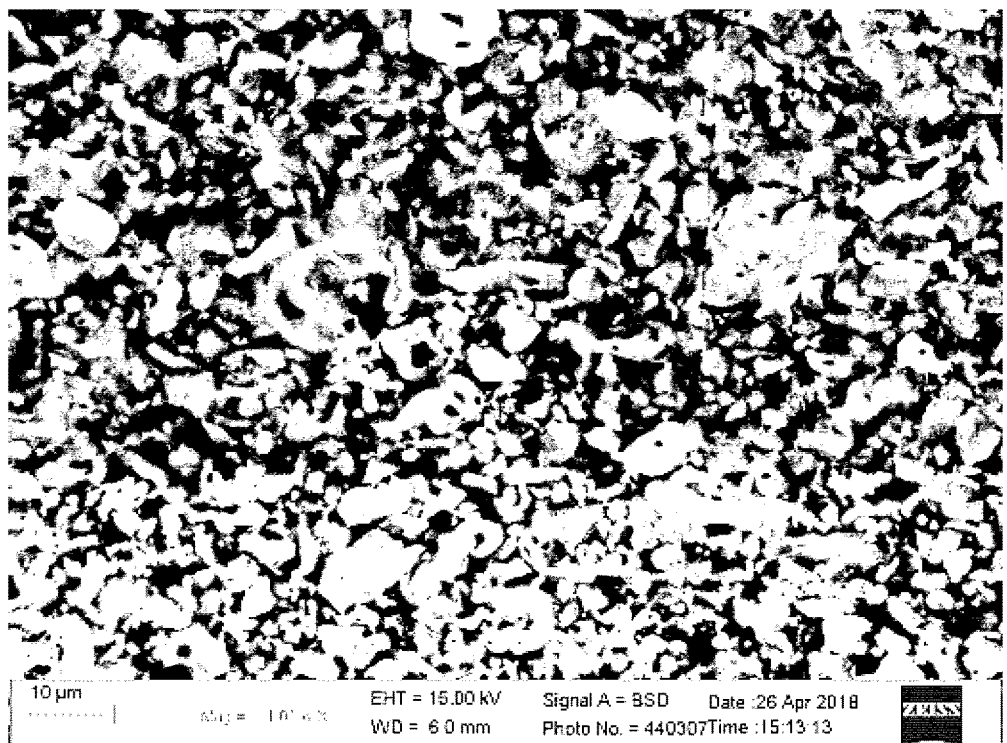
Figure 3C:
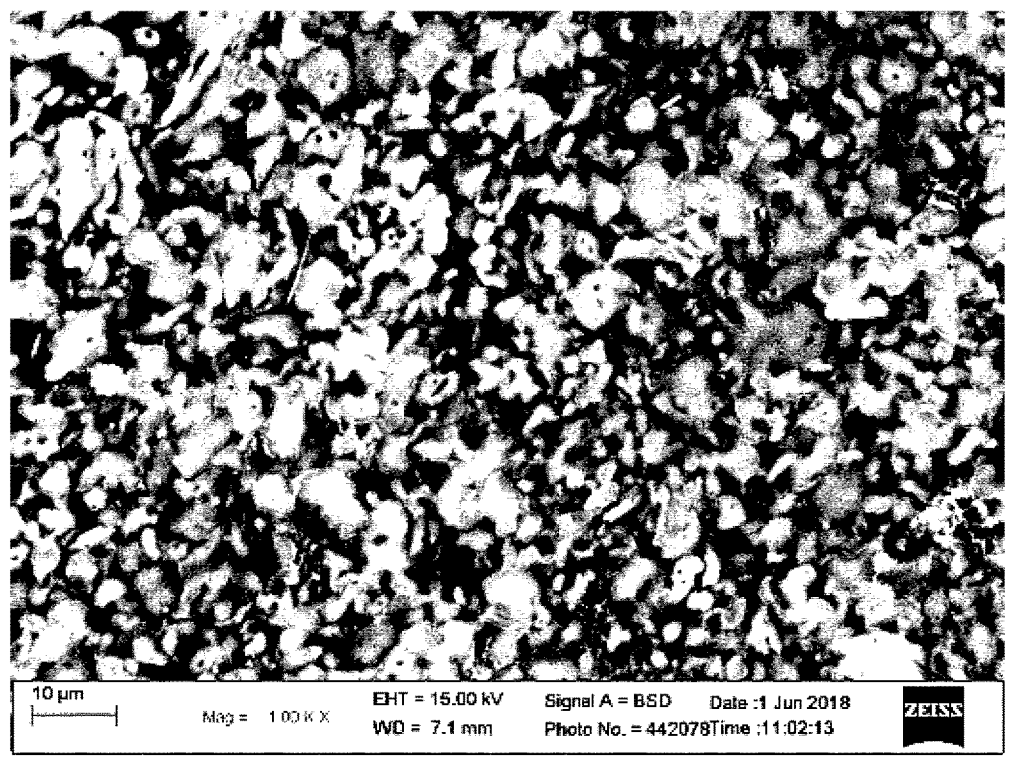
Figure 3D:
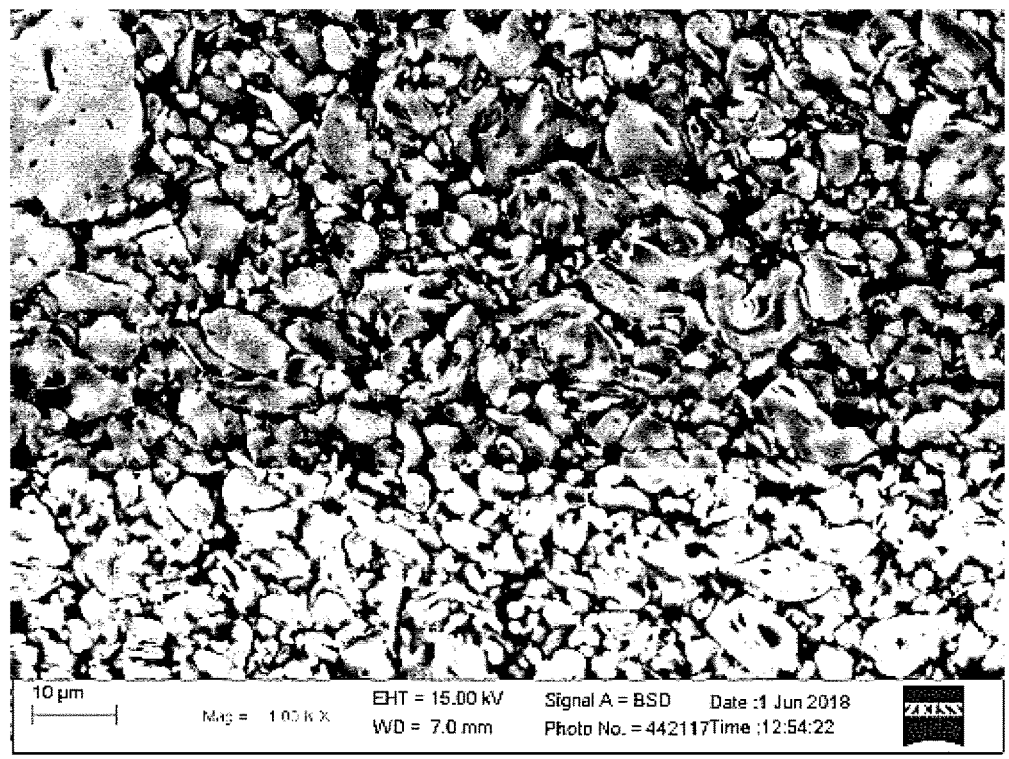
Figure 3E:
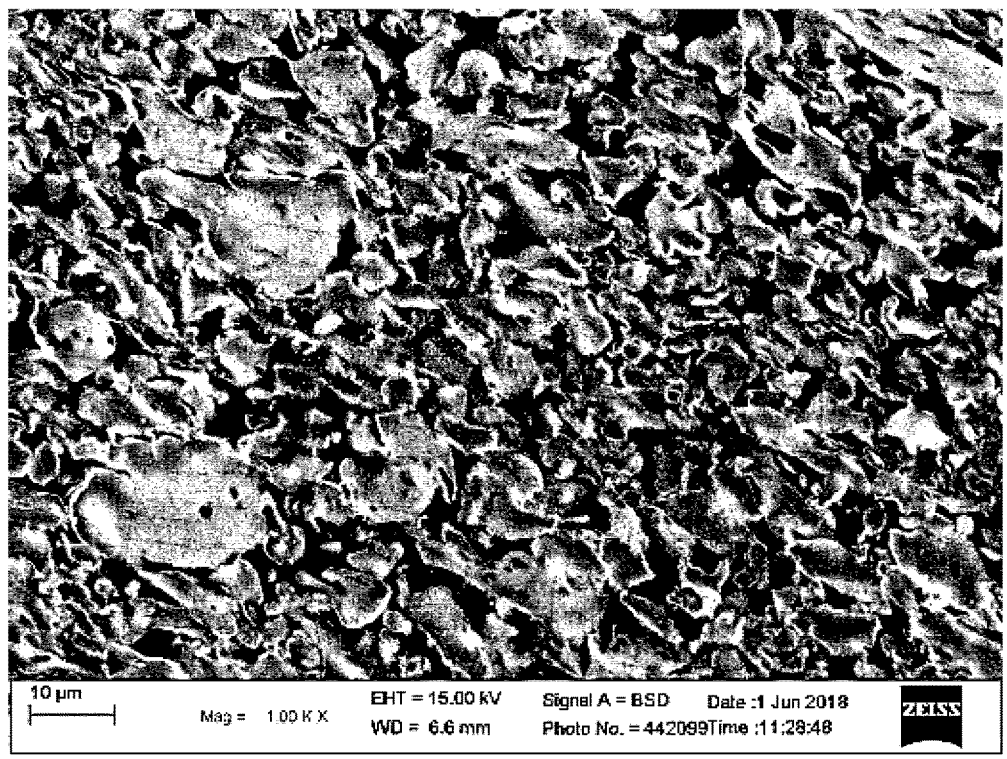
Figure 3F:
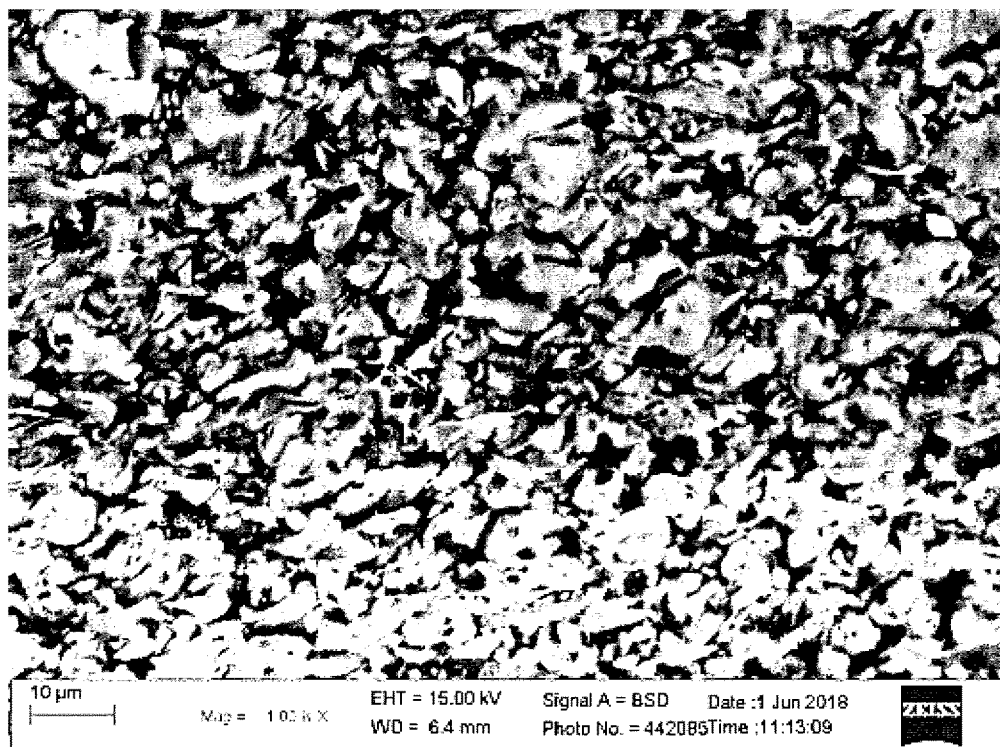
Figure 4A:
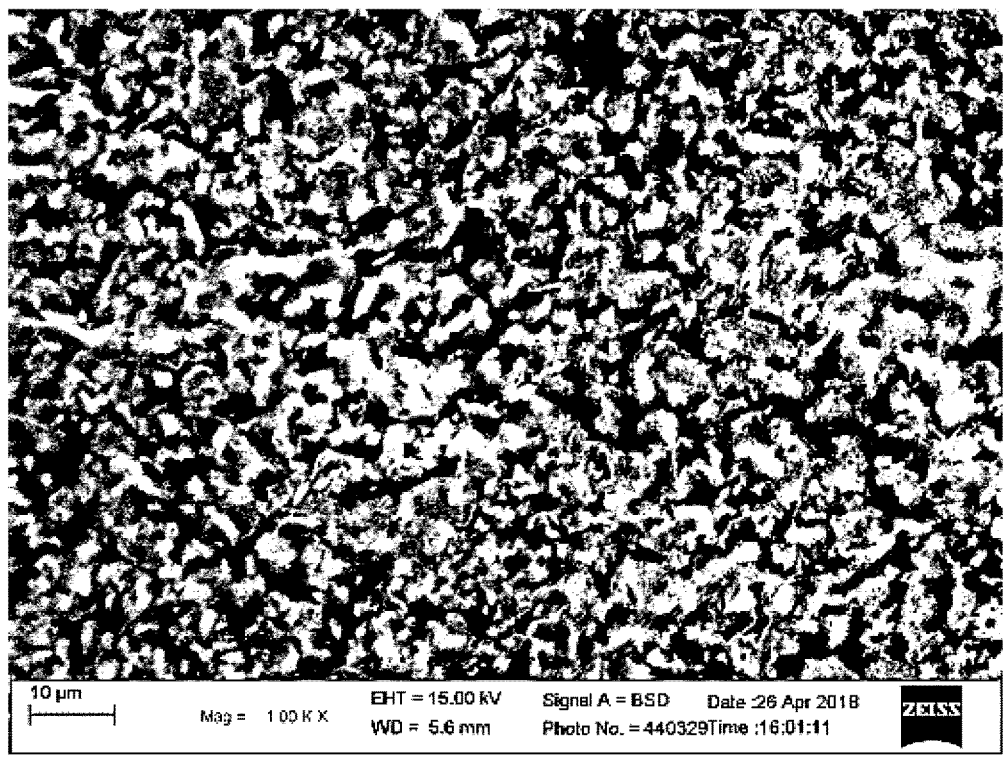
FIGS. 4A-4C are scanning electron microscope (SEM) photos of a detail structure of TPVs made from comparative experiments in the present disclosure.
Figure 4B:
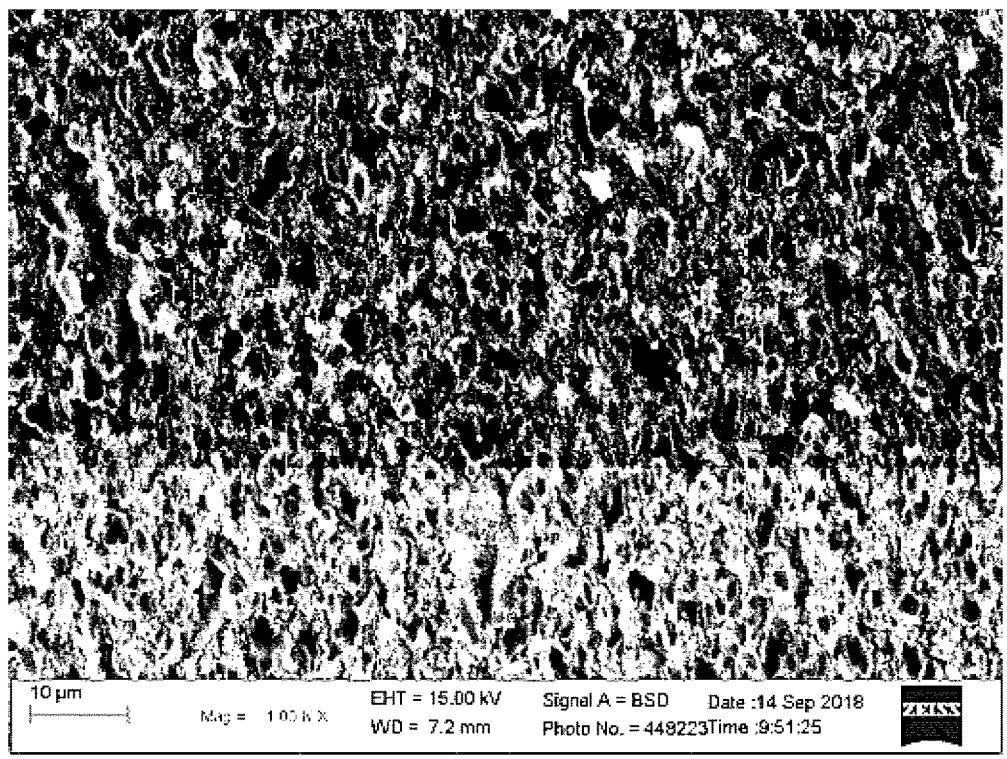
Figure 4C:
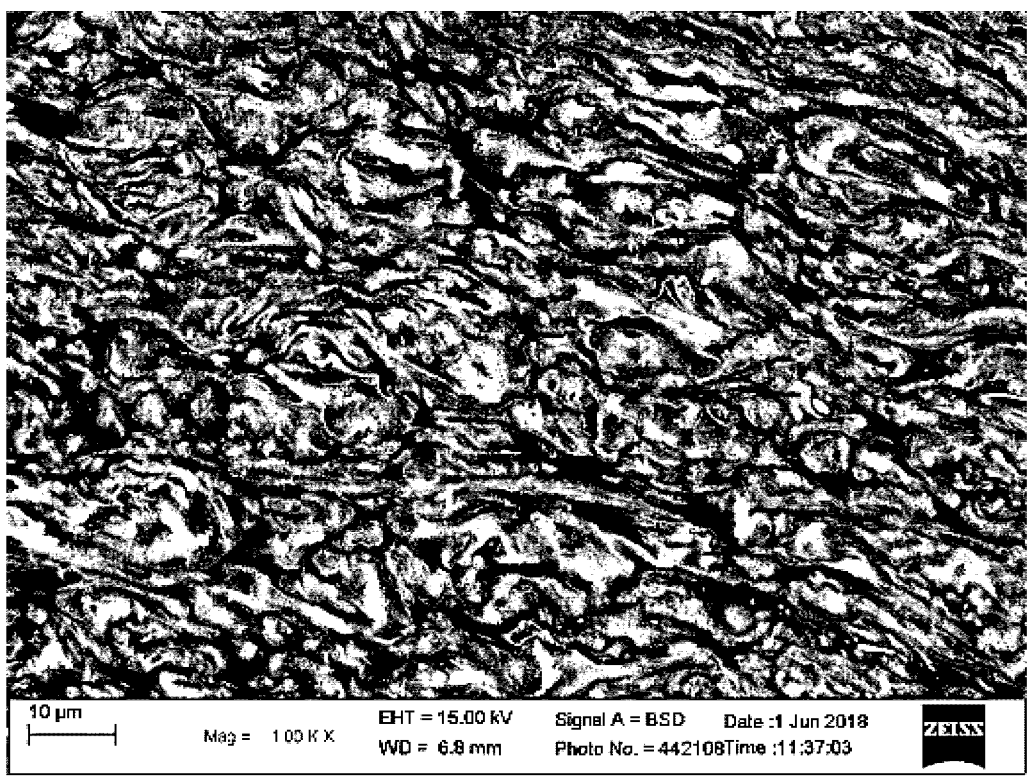

| | surface hardness (Shore D) | tensile strength (kg/cm$^2$) | oil resistance volume/weight (%) | heat resistance maintains rate (%) | SEM photos |
|---|---|---|---|---|---|
| thermoplastic vulcanizate 1 | 63 | 202 | 1.30/1.26 | 90 | FIG. 3A |
| thermoplastic vulcanizate 2 | 57 | 198 | 1.1/1.3 | 93 | FIG. 3B |
| thermoplastic vulcanizate 3 | 57 | 163 | 1.45/1.49 | 89 | FIG. 3C |
| thermoplastic vulcanizate 4 | 51 | 154 | 1.6/1.5 | 88 | FIG. 3D |
| thermoplastic vulcanizate 5 | 46 | 122 | 2.3/2.8 | 82 | FIG. 3E |
| thermoplastic vulcanizate 6 | 53 | 167 | 1.39/1.44 | 87 | FIG. 3F |
| Elastomer A | 44 | 116 | 6.7/8.8 | 71 | — |
| Elastomer B | 34 | 136 | 5.8/6.5 | 69 | FIG. 4A |
| Elastomer C | 30 | 118 | 8.2/9.1 | 55 | FIG. 4B |
| Elastomer D | 23 | 75 | 10.4/9.9 | 53 | FIG. 4C |

As shown in Table 1 and Table 2, if a hydrolysable silane group was not introduced into an acrylic rubber and no crosslinking agent was added (Comparative B-D, for example), no matter what the mix ratio was between a rubber phase and a plastic phase, the properties of the formed elastomers (such as surface hardness, tensile strength, oil resistance and heat resistance) were undesirable. Conversely, as shown in Table 2, the properties of thermoplastic vulcanizates 1-6 (Examples 1-6), which were formed from mixing a modified acrylic rubber with a hydrolysable silane group with a nylon plastic, were all better than those of elastomers B-D (Comparative examples B-D), which were formed from mixing an acrylic rubber without any hydrolysable silane group with a nylon plastic. For example, the thermoplastic vulcanizates had lower change rate of volume, lower change rate of weight and superior maintains rate of mechanical strength. In addition, the properties (such as surface hardness, tensile strength, oil resistance and heat resistance) of thermoplastic vulcanizates 1-6 were also better than that of elastomer A (Comparative example A), which was formed by using conventional crosslinking agent DIAK. It not only shows that the manufacturing process in the present disclosure does not need any organic crosslinking agent, but also the thermoplastic vulcanizates made thereof have much desirable physical properties.

The fine structure of the products from Examples and Comparative examples may refer to FIGS. 3A-3F and 4A-4C. In examples, a modified acrylic rubber with a hydrolysable silane group and nylon plastic were mixed in various ratios, and the modified acrylic rubber processed dynamic crosslinking between each other. The modified acrylic rubber cross-linked each other by the hydrolysable silane group in a much milder way. Therefore, as shown in FIGS. 3A-3F, the acrylic rubber phase may formed apparent particles dispersed evenly in the nylon plastic phase in thermoplastic vulcanizates 1-6 formed from Examples 1-6. Referring to FIGS. 4A-4C, the elastomers B-D formed from Comparative examples B-D by mixing an acrylic rubber with a nylon plastic, cannot foil a desirable rubber dispersed phase. Instead, the acrylic rubber in the elastomers B-D only formed continuous, bulky conglomerate, which shows that the acrylic rubber did not process phase inversion to become a discontinuous phase. Since the acrylic rubber did not process phase inversion effectively to be dispersed in the nylon plastic phase, the physical properties of the final products of the elastomer B-D will be affected as well.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A thermoplastic vulcanizate, comprising:
10-50 parts by weight of a nylon plastic; and
50-90 parts by weight of a cross-linked acrylic rubber, and the cross-linked acrylic rubber is dispersed in the nylon plastic;
wherein the cross-linked acrylic rubber is formed by a cross-link reaction of a modified acrylic rubber with a hydrolysable silane group in presence of water, and the modified acrylic rubber has a linkage between a backbone chain of the modified acrylic rubber and the hydrolysable silane group, wherein the linkage is represented as formula (I) or formula (II):

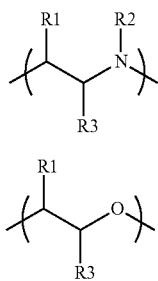

wherein R1 is H or —OH; R2 is H, —Z'—Si(OR')$_3$ or a hydrocarbon group having 1-10 carbon atoms; R3 is H or a hydrocarbon group having 1-10 carbon atoms; Z' is a divalent bridge group; R' is independently a hydrocarbon group having 1-10 carbon atoms.

2. The thermoplastic vulcanizate as claimed in claim 1, wherein R3 is H or a hydrocarbon group having 1-6 carbon atoms; R2 is H, —Z'—Si(OR')$_3$ or a hydrocarbon group having 1-6 carbon atoms; Z' is an alkylene group; R' is independently a hydrocarbon group having 1-6 carbon atoms in the linkage represented as formula (I) or formula (II).

3. The thermoplastic vulcanizate as claimed in claim 1, wherein the cross-linked acrylic rubber is 60-80 parts by weight and the nylon plastic is 20-40 parts by weight.

4. The thermoplastic vulcanizate as claimed in claim 1, wherein the modified acrylic rubber with the hydrolysable silane group has a structure represented by formula (III) or formula (IV):

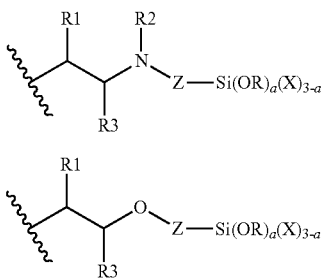

wherein the R1, R2 and R3 are the same as defined in claim 1; a is an integer of 1-3; Z is a divalent bridge group; R is independently a hydrocarbon group having 1-10 carbon atoms; X is independently H or a hydrocarbon group having 1-10 carbon atoms.

5. The thermoplastic vulcanizate as claimed in claim 1, wherein the nylon plastic comprises nylon 6, nylon 66, nylon 12, nylon 46, nylon 610, nylon 11, nylon 612 or a combination thereof.

6. The thermoplastic vulcanizate as claimed in claim 1, wherein the cross-linked acrylic rubber has a spherical shape in the nylon plastic, and an average diameter of about 1-5 μm.

7. The thermoplastic vulcanizate as claimed in claim 1, wherein a change rate of volume of the thermoplastic vulcanizate is equal to or less than 5%, and a change rate of weight of the thermoplastic vulcanizate is equal to or less than 5%, which are measured in accordance with ASTM IRM903 oil/150° C. for 720 hours.

8. The thermoplastic vulcanizate as claimed in claim 1, wherein a change rate of mechanical strength of the thermoplastic vulcanizate is equal to or less than 20%, which are measured in accordance with ASTM D3854-90 air/150° C. for 720 hours.

9. A manufacturing method of a thermoplastic vulcanizate, comprising:
mixing a nylon plastic and a modified acrylic rubber with a hydrolysable silane group to form a mixture, wherein the nylon plastic is 10-50 parts by weight and the modified acrylic rubber is 50-90 parts by weight; and
subjecting the modified acrylic rubber to a crosslinking reaction by using water as a crosslinking agent and in presence of a metal catalyst to form a Si—O—Si bond between the modified acrylic rubber;
wherein the modified acrylic rubber has a linkage between a backbone chain of the modified acrylic rubber and the hydrolysable silane group, and the linkage is represented as formula (I) or formula (II):

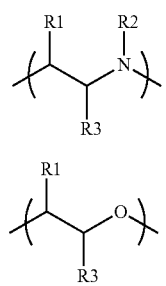

wherein R1 is H or —OH; R2 is H, —Z'—Si(OR')$_3$ or a hydrocarbon group having 1-10 carbon atoms; R3 is H or a hydrocarbon group having 1-10 carbon atoms; Z' is a divalent bridge group; R' is independently a hydrocarbon group having 1-10 carbon atoms.

10. The manufacturing method of a thermoplastic vulcanizate as claimed in claim 9, wherein R3 is H or a hydrocarbon group having 1-6 carbon atoms; R2 is H, —Z'—Si(OR')$_3$ or a hydrocarbon group having 1-6 carbon atoms; Z' is an alkylene group; R' is independently a hydrocarbon group having 1-6 carbon atoms in the linkage represented as formula (I) or formula (II).

11. The manufacturing method of a thermoplastic vulcanizate as claimed in claim 9, wherein the manufacturing method is a dynamic crosslinking process.

12. The manufacturing method of a thermoplastic vulcanizate as claimed in claim 11, wherein the mixing step is performed at a temperature of about 180-280° C.

13. The manufacturing method of a thermoplastic vulcanizate as claimed in claim 9, wherein the modified acrylic rubber is 60-80 parts by weight and the nylon plastic is 20-40 parts by weight.

14. The manufacturing method of a thermoplastic vulcanizate as claimed in claim 9, wherein the metal catalyst is a catalyst containing tin.

15. The manufacturing method of a thermoplastic vulcanizate as claimed in claim 14, wherein the catalyst containing tin comprises dibutyltin dilaurate, dibutyltin dilaurate (???), dibutyltin dioctanoate, or a combination thereof.

16. The manufacturing method of a thermoplastic vulcanizate as claimed in claim 9, wherein an amount of metal catalyst is 0.5-1.5 wt % of a weight of the modified acrylic rubber.

17. The manufacturing method of a thermoplastic vulcanizate as claimed in claim 9, wherein the hydrolysable silane group in the modified acrylic rubber accounts for 2-4 wt % of the modified acrylic rubber.

18. The manufacturing method of a thermoplastic vulcanizate as claimed in claim 9, wherein the modified acrylic rubber has a structure represented as formula (III) or formula (IV):

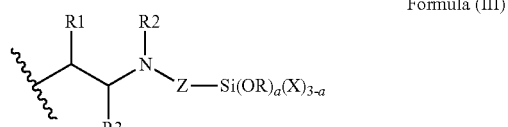

Formula (III)

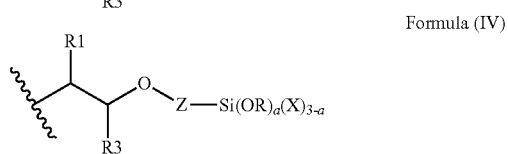

Formula (IV)

wherein the R1, R2 and R3 are the same as defined in claim 9; a is an integer of 1-3; Z is a divalent bridge group; R is independently a hydrocarbon group having 1-10 carbon atoms; X is independently H or a hydrocarbon group having 1-10 carbon atoms.

19. The manufacturing method of a thermoplastic vulcanizate as claimed in claim 9, wherein the nylon plastic comprises nylon 6, nylon 66, nylon 12, nylon 46, nylon 610, nylon 11, nylon 612 or a combination thereof.

20. The manufacturing method of a thermoplastic vulcanizate as claimed in claim 9, wherein an addition amount of water is 10 wt % of the modified acrylic rubber.

* * * * *